March 22, 1932.   B. G. GOBLE   1,850,751
AUTOMATIC ALIGNING BEARING
Filed Dec. 14, 1929
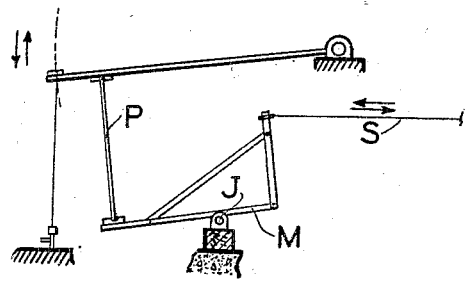
FIG.1.
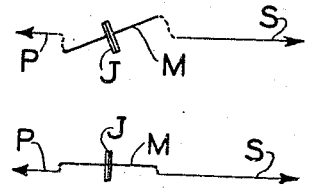
FIG.2.
FIG.3.
FIG.4.
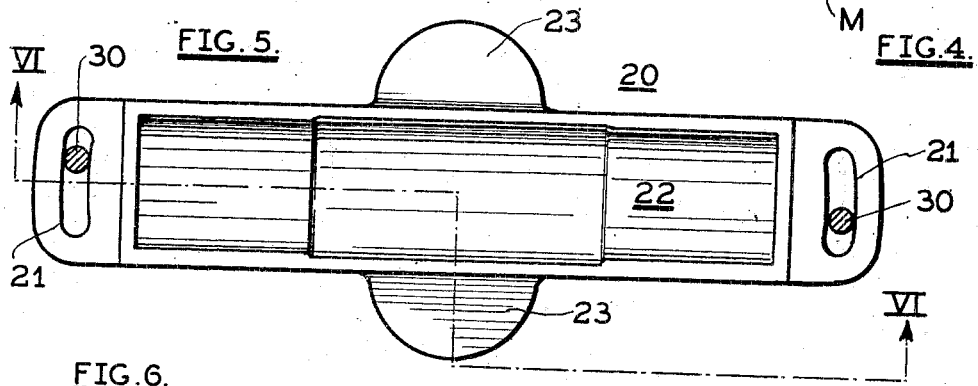
FIG.5.
FIG.6.
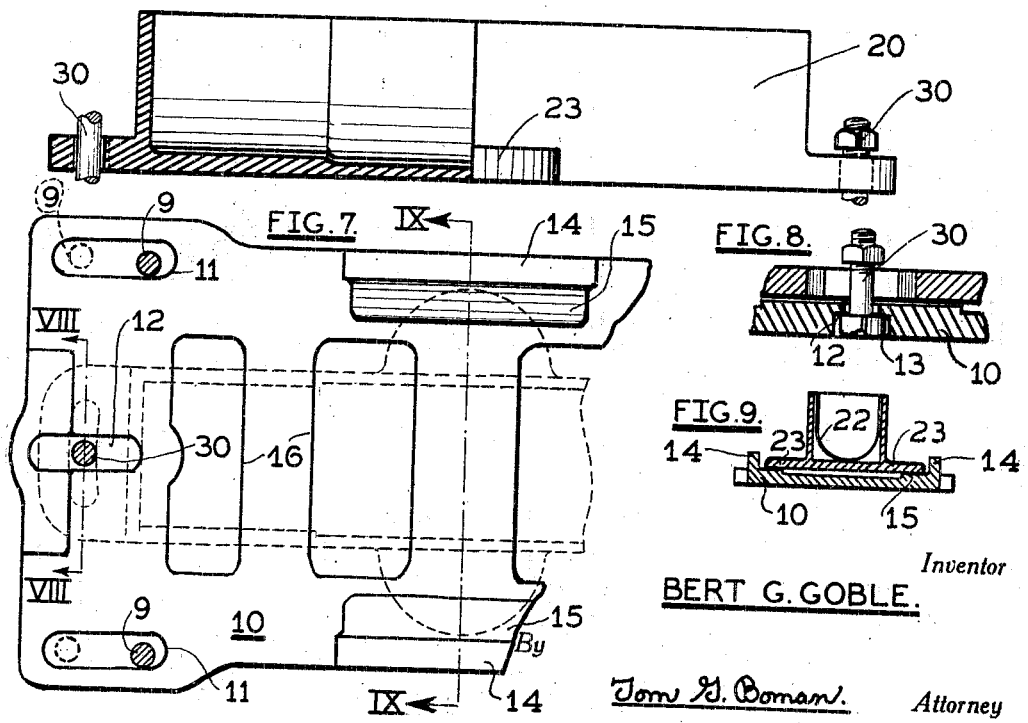
FIG.7. FIG.8. FIG.9.
Inventor
BERT G. GOBLE.
By Tom G. Boman. Attorney Patented Mar. 22, 1932

1,850,751

UNITED STATES PATENT OFFICE

BERT G. GOBLE, OF TULSA, OKLAHOMA, ASSIGNOR TO W. A. QUIGLEY

AUTOMATIC ALIGNING BEARING

Application filed December 14, 1929. Serial No. 414,166.

My invention relates to an automatic aligning bearing and more definitely to a simplified bearing plate for pumping jacks.

As is well understood by those skilled in this art it is difficult to correctly position the base of a pumping jack and hence it is desirable to provide adjustments for the oscillating portion of the jack which is supported upon the base. I am aware that there are several adjustable plates of this type upon the market today but it is my aim to create a much simpler plate which will operate in an improved manner over those now existent.

Briefly described, my invention consists of a base plate and a bearing support thereon. The bearing support houses the oscillating journal and may slide and twist with reference to the base plate. This action is by virtue of curved portions on the bearing support contacting with upstanding lugs on the base plate.

Under operating conditions the bearing support twists and aligns itself to its most efficient position, which is directly crosswise to the line or pull upon the jack, and also tends to shift sidewise to the proper plane of action. My bearing will allow both of these movements to occur. Furthermore, since the bearing support is substantially held in line with the axis of the oscillating journal and since it is free to move it will seek a horizontal position and hence the base plate may be adjusted to properly support it.

One advantage of my device lies in the fact that I obtain a double adjustment from my slots in the base plate. In other words my side adjustment is twice the length of the slots.

Another advantage is that I have no pivot point. The upper bearing support merely slides on the base plate and can shift crosswise and also turn or twist. The curved slots allow for fastening the bearing support in place.

Yet another advantage is that the extending side portions on the bearing support prevent it from tilting about its axis and thus very little strain is placed on the bolts.

Further objects, and objects pertaining to the details and economies of construction and operation of my invention will definitely appear from the detailed description to follow.

I attain the above objects and advantages by the mechanism illustrated in the accompanying drawings, in which—

Figure 1 is a schematic view of an ordinary pumping jack.

Figure 2 is a diagrammatic plan view of the oscillating portion of a jack in a twisted position.

Figure 3 is a diagrammatic plan view of the oscillating portion of a jack in an out-of-line position.

Figure 4 is a diagrammatic plan view of the oscillating portion of a jack in both a twisted and out-of-line position.

Figure 5 is a plan view of the saddle or bearing support.

Figure 6 is a view taken along the line VI—VI of Figure 5.

Figure 7 is a plan view of the support or base plate.

Figure 8 is a view taken along the line VIII—VIII of Figure 7.

Figure 9 is a view taken along the line IX—IX of Figure 7.

Similar numerals represent similar parts throughout the several views.

Referring now to the drawings and particularly Figures 1, 2 and 3, —M— indicates the oscillating member which pivots about a journal —J—. The prime mover is the rod line —S— and the member —M— operates the pitman —P—. As shown in Figure 2 the member —M— is twisted out of line and the arrows on the rod line indicate the strain which tends to pull the jack back into proper alignment. Similarly, in Figure 3, the oscillating frame is sidewise out of position and the forces tend to pull it back into position. In Figure 4 the frame —M— is both twisted and sidewise out of position and the forces indicated tend to properly replace it to position.

Figures 5 and 6 illustrate a saddle or bearing support —20— having a hollowed out portion —22— which supports or houses a journal member (not shown). This may be the above journal member —J—. The bearing support —20— has circumferential slots —21— and extending portions or ears —23—. These ears ride against abutments on the base plate and their curvature allows aligning of the bearing support to occur.

Figure 7 shows a support or base plate —10— having side longitudinal slots —11— and central longitudinal slots —12—. Bolts —30— have their heads seated in the undercut portions —13— of the slots —12— and extend upwardly through the curved slots —21— in the upper bearing support. Bolts —9— pass through slots —11— and hold the base plate in an adjustable manner to a suitable foundation (not shown). Thus sidewise adjustment is secured.

As clearly shown in Figure 7, apertures or holes —16— provide for lightness of this casting. In this figure the bearing support is shown in dotted lines on its base plate.

The base plate has abutments or lugs —14— and bearing portions —15— adjacent thereto. The extensions —23— are adapted to slidably rest upon these bearing portions. See Figure 9.

The operation is readily understood. The foundation bolts —9— are fixed in a foundation in as near their proper position as possible and the slots —11— of base plate —10— set centrally thereover. Then the upper saddle or bearing support is seated on the base plate and the journal rides in its hollowed out part in the usual manner. The side slots —11— in the base plate allow for side adjustment and also the slots —12— permit an equal amount of side adjustment. Thus plenty of side movement is allowed without having a long and necessarily weak slot. The curved slot in the top member allows it to twist and hence align itself. The portions —23— abut the lugs and permit both sidewise and rotative movement.

Without limiting myself to the particular embodiment of my invention illustrated and explained above, and desiring to protect my invention in the broadest manner legally possible what I claim is:

1. A bearing device for a horizontal oscillating journal member comprising a bearing support hollowed out to receive the journal member and having circumferential slots therein with reference to a vertical axis through the symmetrical axis of the bearing support, extending curved ear portions on the bearing support; a base plate having upstanding lugs against which said extending curved ear portions may ride, said base plate also having slots adapted to align with the slots in the bearing support.

2. A device of the character described comprising a saddle having a hollowed out portion extending lengthwise therein, and slots near the ends of the hollowed out portion, said saddle also having lugs rigid therewith and extending outwardly crosswise to the hollowed out portion, said lugs having curved outer edges for the purpose described.

3. In a saddle mounting for the wire line pumping jacks of oil well pumps, a base adapted to be secured to a suitable support and having longitudinally opposed abutments, a saddle casting having curved ears on either side thereof, said curved ears being adapted to ride against the adjacent abutment, the saddle casting having adjacent each end thereof an arcuate slot and a securing element extending through each arcuate slot and a corresponding longitudinal slot of the base for securing said saddle casting in adjusted position.

4. A saddle mounting as set forth in claim 3 but further characterized by the fact that the slots in the base plate are parallel to the axis of the journal member.

In testimony whereof I affix my signature.

BERT G. GOBLE.